United States Patent [11] 3,545,640

[72] Inventors John F. Delahunt
 Florham Park;
 John J. Turney, Chester, New Jersey
[21] Appl. No. 759,429
[22] Filed Sept. 12, 1968
[45] Patented Dec. 8, 1970
[73] Assignee Esso Research and Engineering Company
 a corporation of Delaware

[54] PROTECTIVE GAS SEALS FOR NON-METALLIC TANK BOTTOMS
 3 Claims, 2 Drawing Figs.
[52] U.S. Cl. .................................................. 220/5, 220/69
[51] Int. Cl. ................................................... B65d 7/02
[50] Field of Search .................................. 220/5(A), 5, 1(B), 18, 85(B), 85(A), 45, 44(D), 69, 68

[56] References Cited
UNITED STATES PATENTS
| | | | |
|---|---|---|---|
| 1,941,922 | 1/1934 | Worth | 220/63X |
| 2,186,185 | 1/1940 | Walker | 220/68UX |
| 2,657,826 | 11/1953 | Ludowitz | 220/68X |
| 2,814,406 | 11/1957 | Marancik | 220/18X |
| 2,859,895 | 11/1958 | Beckwith | 220/65 |
| 3,019,937 | 2/1962 | Morrison | 220/9(A)UX |
| 3,423,264 | 1/1969 | Miron et al. | 220/18X |

Primary Examiner—Joseph R. Leclair
Assistant Examiner—James R. Garrett
Attorney—Manahan and Wright and Finnegan, Henderson and Farabow ABSTRACT: A gas seal is used to protect the edges of nonmetallic tank bottoms to prevent contact with stored liquid contents and prevent leakage.

PATENTED DEC 8 1970

3,545,640

J. F. Delahunt
J. J. Turney
Inventors

By Donald F. Mohlers
Attorney

PROTECTIVE GAS SEALS FOR NON-METALLIC TANK BOTTOMS

BACKGROUND OF THE INVENTION

This invention relates to liquid storage tanks having nonmetallic bottoms. More particularly, it relates to means for extending the leakproof life of nonmetallic bottoms while enhancing the use of corrosion resistant nonmetallic materials in tank bottoms.

The use of liquid storage tanks is common to many industries. It has been felt desirable to use nonmetallic bottoms both in new tanks and to cover and repair the inside of the bottom of corroded metal tanks. Whether used in new tanks or to repair old tanks, the use of corrosion resistant nonmetallic bottoms markedly reduces construction costs, erection times, and it may also vastly reduce, or even eliminate, bottom corrosion. In a typical tank construction, a nonmetallic bottom may be installed within an existing tank having a metallic bottom, or it may be installed in a new tank having a metallic shell and any adequate supporting means under the shell. In either case the nonmetallic bottom material is applied or spread upon the support means or existing bottom and its edges are extended a short distance up the sides of the metallic shell. The nonmetallic bottom material may be applied as a liquid, for example, as epoxy resins which are cured and hardened after being applied. Alternatively, the nonmetallic bottom may comprise a solid film or layer of material, such as a plastic, e.g., polyethylene, polypropylene, vinyl, and the like, an elastomer, e.g., butyl, neoprene, ethylene-propylene rubber, and other similar materials. When applied as a solid, it is necessary to sealantly secure the bottom material to the metallic shell and the support means by heat sealing or by using an additional adhesive agent. Such adhesive agents may include, for example, organic polymeric materials such as epoxies, phenolics, butyl elastomers and the like. It is also possible, and sometimes even preferable, to use a combination of solid material such as a glass weave or mat and a liquid material which sets upon curing, such as epoxy resin, to construct a very strong and highly corrosion resistant nonmetallic bottom.

In copending application U.S. Pat. Ser. No. 759,428, filed of even date herewith, now U.S. Pat. No. 3,533,531 entitled "Liquid Storage Tanks" by J. F. Delahunt, there is disclosed a unique technique for securing nonmetallic bottoms to new or existing tank structures to achieve special economies and advantages. Briefly, the improved bottom disclosed therein involves the use of nonmetallic bottom which is adhesively secured to the tank shell and support means only at its periphery, leaving the center portion of the bottom in unattached relation to the support means.

The use of nonmetallic bottoms has not been entirely without difficulties. It has been found that nonmetallic bottoms in metallic shells may develop leaks in unpredictable lengths of times and to variable extents. It is thus an object of the present invention to provide a means whereby the leakproof life of nonmetallic bottoms can be greatly extended while making it possible to use a wider range of types of adhesives heretofore considered inapplicable for tanks used to store incompatible liquids.

SUMMARY OF THE INVENTION

This invention is based on the discovery that leakage in nonmetallic tank bottoms results from a disbonding or loss of adhesion between the nonmetallic material and the metallic shell or support means of the tank. The precise nature of the disbonding phenomena is unknown. However, it appears to result from both chemical and mechanical influences that change or modify the surface of the metal or the characteristics of the adhesive when in contact with stored liquids. Even liquids thought to be generally noncorrosive, such as water, tend to have an effect which increases the rate of disbonding between the nonmetallic and metallic surfaces. Thus, the critical location subject to disbonding is the junction between the edges of the nonmetallic bottom material and the metal shell of the tank. The disbonding first occurs in the immediate vicinity of this junction and then progresses downwardly to the bottom of the shell until liquid is enabled to leak from the tank bottom through the support means. The present invention provides a means of preventing liquid contact with the junction of the edges of the nonmetallic bottom and the metallic shell to prevent initial disbonding in this area.

This invention contemplates a storage tank for liquids having a metallic shell, a nonmetallic bottom resting on a support means or foundation, the edges of the nonmetallic bottom extending ending upwardly along the inner walls of the shell and having a gas seal means adapted to exclude liquid contact from the junction between the inner walls of the shell and the upwardly extending edges of the nonmetallic bottom. Thus, the invention contemplates encompassing the upper edges of the nonmetallic bottom within a gas seal and providing gas within the seal under sufficient pressure to prevent the liquid in the storage tank from rising up to the level of the edges of the nonmetallic bottom.

DESCRIPTION OF THE PREFERRED EMBODIMENTS

Figure 1:
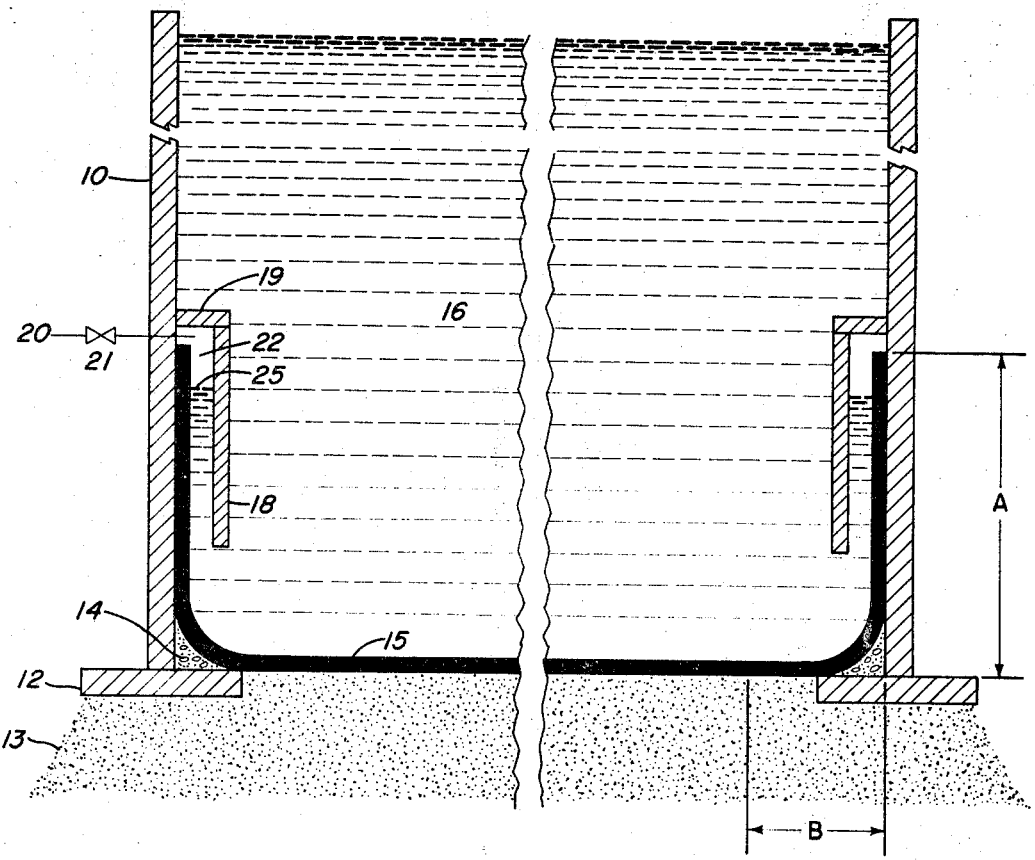
FIG. 1 shows, in cross section, a tank having a nonmetallic bottom in combination with the unique gas seal designed in accordance with the present invention.

In the drawings there is shown certain preferred embodiments of the invention involving cylindrical tanks having nonmetallic bottoms in combination with gas seals adapted to protect the upper edges of the bottoms to exclude them from contacting liquids. Referring specifically to the drawings, there is shown a cylindrical tank, which may be of any diameter. Generally, for practical operations, the seal-nonmetallic bottom combination is most practical for use in tanks of at least about 20 feet in diameter. The tank shell 10 can be of any conventional metal, such as carbon steel or low-alloy steels. The particular metal selected will depend upon the actual service, i.e., temperature, pressure, type of liquid, to which it is to be subjected. Most large metallic cylindrical liquid storage tanks are, in practice, constructed of conventional carbon steels.

The tank shell 10 rests upon and is supported by a support member 12, which can be either metallic or nonmetallic. Generally, for convenience, the support member 12 will also be composed of carbon steel. The entire tank rests upon a support, base, or foundation 13 which can comprise concrete, steel or other metals, or even packed earth. The foundation or support 13 and support member 12 may, in fact, be a single unified support of the same material. In one embodiment of the invention the supports 12 and 13 comprise the metallic bottom of a preconstructed tank having both a metallic shell and bottom.

Within the tank at the intersection of the support member 12 and the shell 10 it is generally desirable to provide a fillet 14, which can be composed of such materials as concrete- or sand-filled resinous cements. In practice it is generally desirable to use concrete. A nonmetallic bottom material 15 is applied to the surface of the support means 13 and the edges of the nonmetallic bottom are extended upwardly inside the metallic shell. The fillet 14 is designed with a smooth surface to prevent undue strains on the nonmetallic material which would result from a sharp corner. The nonmetallic bottom material 15 can be any conventional material depending upon the use or environment in which it is to be placed. For example, the bottom can comprise a solid layer of prepared plastic or elastomer which is glued or secured into place by the use of appropriate adhesives suitable for securing nonmetallic materials to other dissimilar materials, such as the metallic shell or the support means and fillet.

In a particularly preferred embodiment of the invention, the nonmetallic bottom is adhesively secured to the support means, fillet and metallic shell only at its periphery (indicated in FIG. 1 by the zones A and B). By adhesively securing the nonmetallic bottom only over the narrow portions A and B of the tank shell and support means, vast economies are achieved in that it is unnecessary to prepare the entire bottom or support for securing with appropriate adhesives. Thus, where the support means comprises an original metallic tank bottom, it is unnecessary to prepare the tank bottom for adhesion by sandblasting, cleaning, and priming the surface. Furthermore, by securing the nonmetallic bottom only at its periphery, excellent characteristics of flexibility and resistance to stress are imparted in the tank structure at the bottom after completion of the vessel. Generally, it is unnecessary to prepare surfaces A and B which are greater than about one-quarter of the shell height and diameter, respectively. In fact, it is preferred to keep the dimensions of both A and B to less than about 3 feet and preferably between about 12 and 18 inches.

It is also desirable, in some cases, to use nonmetallic bottoms which are applied as a liquid and then set by application of heat or by catalytic means. Exemplary of such liquid materials are the liquid resins, such as the epoxy resins, which can be applied as a viscous liquid and then hardened by curing at ambient conditions to form a very durable and strong nonmetallic bottom. For additional strength and ease of application, it may be desirable to employ a laminate when such liquid materials are used. For example, a particularly preferred bottoming material combination is a laminate prepared from glass cloth or weave and liquid epoxy resin.

Whether the nonmetallic bottom selected is adhesively secured to the entire surface of the support means or only to the periphery and whether it is applied as a solid or as a liquid, it is used in accordance with the present invention in combination with applicants unique gas seal. In the particularly preferred combination, the gas seal is used with the nonmetallic bottom which has been secured only at its periphery, since such bottoms are most sensitive to partial disbonding from the metallic shell.

FIG. 1 shows a gas seal leg consisting of a cylindrical metallic tube 18 slightly smaller than the diameter of the tank shell 10 to leave an annular space between the shell and tube. The annulus should be of minimal size, but, in any event, it is desirable to provide a space of at least one-half inch, but less than about 12 inches between the shell 10 and tube 18. The tube 18 is sealantly attached to the metallic shell by means of ring plate 19. Both tube 18 and plate 19 can be composed of conventional metals and welded to the shell or otherwise attached in any conventional manner which is suitable for providing a gastight connection.

Figure 2:
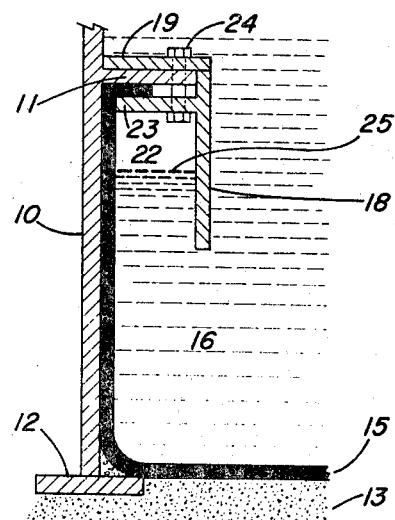
FIG. 2 shows, in cross section, a portion of the tank and gas seal combination of this invention having a specially designed mechanical joint which functions to provide additional sealing strength and which supports the gas seal.

FIG. 2 illustrates a second variety of seal leg which includes the cylindrical tube 18, and plate 19. However, the leg is made removable by providing the means for attaching it to the shell through the use of a clamp arrangement including arms 23 and 11 extending from the seal tube 18 and metallic shell 10, respectively, clamped together by means of bolts 24. Gastight construction is achieved by clamping the overlapping edge of the nonmetallic bottom 15 between said extending arms. Alternatively, appropriate gaskets or other sealing devices can be used.

In operation, an empty tank contains only air or, if desired, inert gases. Upon filling the tank with liquid 16, the liquid rises upwardly within the seal leg until it reaches an equilibrium height 25, at which the gas pressure in the gas space of the seal 22 has built up to balance the head of liquid in the tank. Thus, it is required to design the seal leg such that at the highest liquid tank levels the pressure within the seal will develop to a counterbalancing pressure before the surface of liquid 25 within the seal rises up to contact the junction between the upwardly extending edges of the nonmetallic bottom 15 and the metallic shell 10. Preferably, it is desirable that the liquid surface 25 be kept at least 1 inch, and preferably from about 3 to 12 inches, below the upper edge of the nonmetallic bottom. This prevents the liquid from contacting the junction between the edge and the metallic shell in the event of splashes, bubbling, etc.

By way of example, in a tank used to store water when the liquid head above the seal is 36 feet, the total pressure necessary to counterbalance the force of the liquid is about 2 atmospheres. Thus, if the tank is originally filled at atmospheric pressure, the gas is compressed to half its original volume, so that gas space 22 comprises one-half the total volume within the gas seal leg. Accordingly, it is desirable to minimize the space in the gas seal leg which is above the edges of the nonmetallic bottom, since this will result in keeping the upper surface of the liquid 25 at a maximum distance from said upwardly extending edges.

Since the pressure on both sides of the seal leg is the same, it is not essential that the leg be constructed of materials which are particularly strong. In practice, however, it is convenient to use preformed carbon steel welded to the tank shell.

When the liquid 16 stored in the tank is one in which the air or inert gas in the seal has a high solubility, problems may sometimes be encountered. For example, if the liquid absorbs a substantial quantity of gas in space 22, the liquid surface 25 will be permitted to rise to higher and higher levels as the gas disappears. This eventually defeats the purpose of having the seal by allowing the liquid to contact the upwardly extending edges of the nonmetallic bottom. Therefore, when highly soluble gases are involved, it may be desirable to provide a means for replenishing dissolved gas. FIG. 1 shows such a means in line 20, which extends into the gas space 22. An inert gas or air is supplied through the line and its feed rate into the gas space 22 is controlled by valve 21, which may be manually regulated at intermittent intervals, or may be automatically controlled by appropriate instruments to maintain a constant level 25 of the liquid within the seal leg. Generally, the solubility of the gas is only a problem when the liquid is stored for great lengths of time, since the contacted surface 25 of liquid in the seal leg will generally be quite small.

While the invention has been described in detail with respect to the installation of a nonmetallic bottom in a new tank, it also provides an excellent means for repairing tanks having corroded bottoms by installing a nonmetallic cover over the corroded area and then protecting the edges of the cover or bottom using the unique seal arrangement in accordance with this invention. Many other variations and combinations will be apparent to those skilled in the art, and it is intended that the full scope and spirit of the invention not be limited solely to the embodiment disclosed.

We claim:

1. A storage tank for liquid having a vertically extending peripherally closed metallic shell disposed on a horizontal support means, the improvement comprising in combination:
    a nonmetallic bottom resting on said support means with the edge portions of said bottom extending vertically lining portions of and secured to the inner face of said shell;
    gas seal means fluid-tightly connected to the inner face of said shell above the top edge of the vertically extending portions of said nonmetallic bottom and extending downward, parallel to the inner face of said shell to a substantially horizontal free edge below said top edge; and
    means for adding gas to the space encased by said shell and said gas seal means while the free edge of said seal means is submerged in said liquid.

2. A storage tank for liquid having a vertically extending cylindrical metallic shell disposed on a horizontal support means, the improvement comprising in combination:
    a nonmetallic bottom resting on said support means with the edge portions of said bottom extending vertically lining portions of and secured to the inner face of said cylindrical shell; and
    a cylindrical tube concentrically disposed within said cylindrical shell and separated therefrom by an annular space, said concentric tube extending above and below the upper edges of the vertically extending edge portions of said nonmetallic bottom. The upper end of said tube being sealantly connected to the shell above said edges.

3. A storage tank in accordance with claim 2 including means for adding gas to said annular space.